Figure 1:
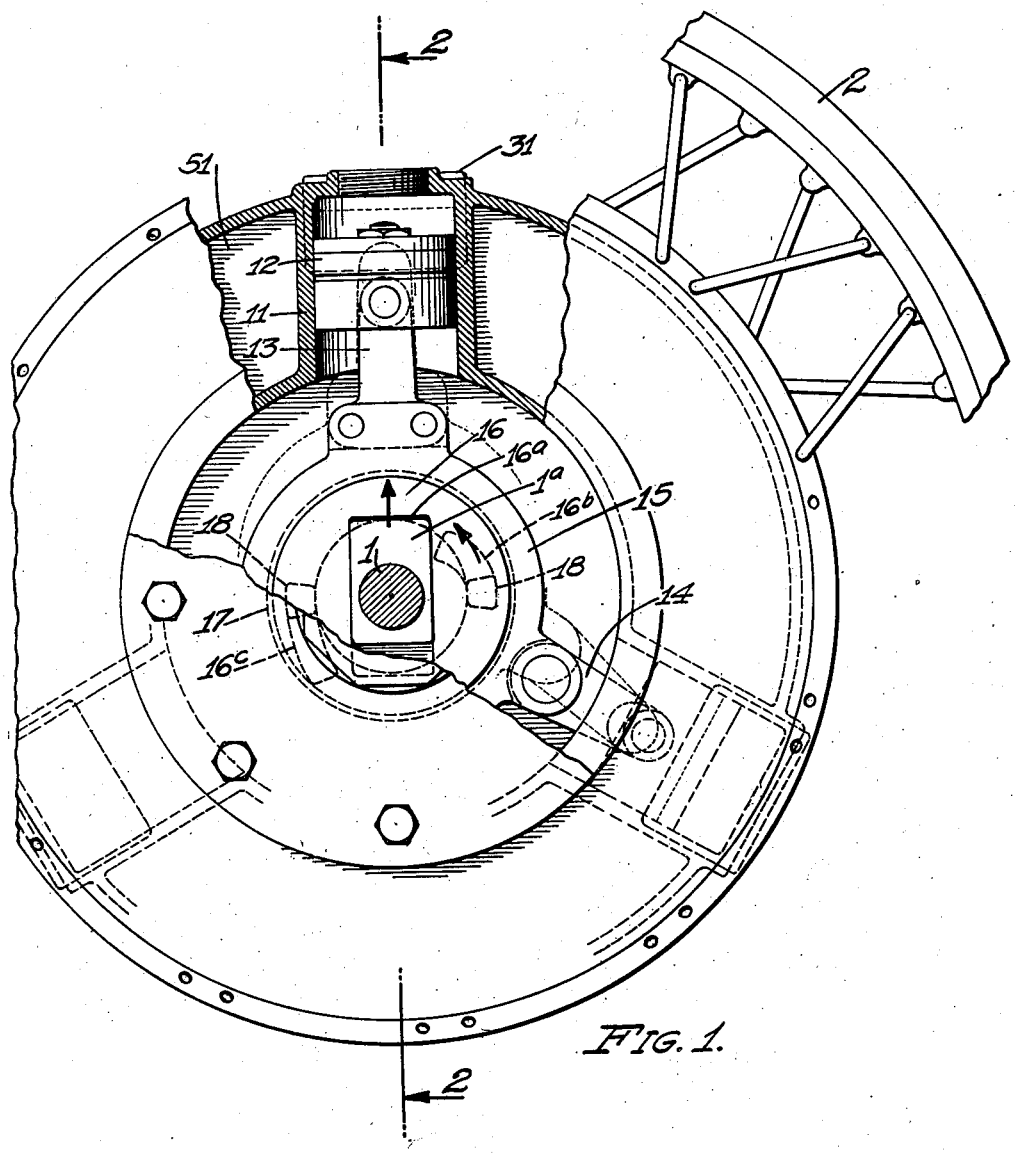

Feb. 11, 1936.   H. E. MARSH   2,030,308
HYDRAULIC BRAKE
Filed Oct. 2, 1933   2 Sheets-Sheet 1

INVENTOR
HOWARD E. MARSH
BY William E. Hall
ATTORNEY

Feb. 11, 1936.  H. E. MARSH  2,030,308
HYDRAULIC BRAKE
Filed Oct. 2, 1933  2 Sheets-Sheet 2
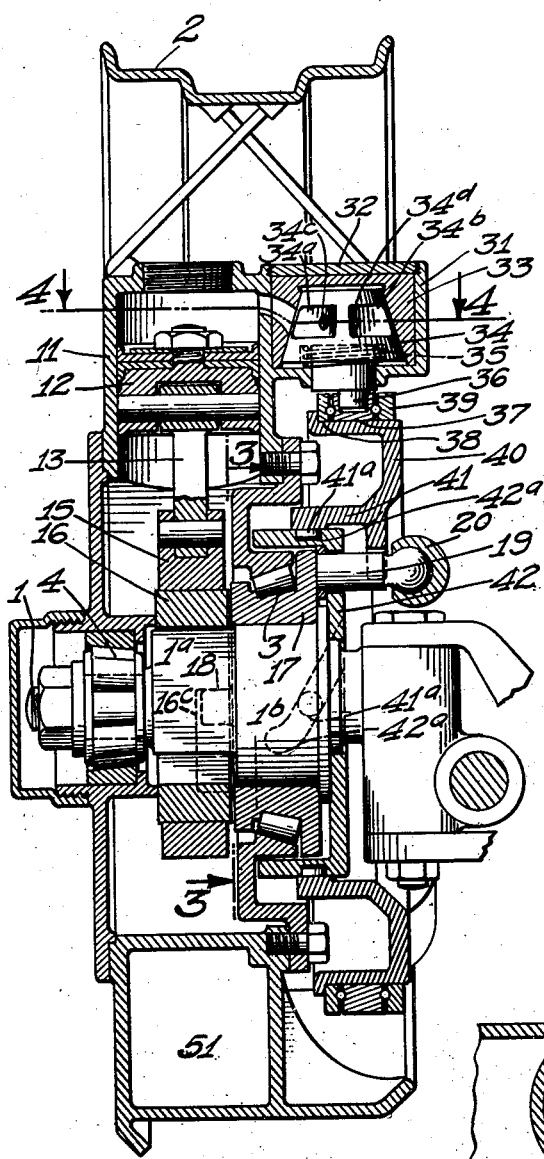
INVENTOR
HOWARD E. MARSH
BY William E. Hall
ATTORNEY.

Patented Feb. 11, 1936

2,030,308

UNITED STATES PATENT OFFICE 2,030,308

HYDRAULIC BRAKE

Howard E. Marsh, Ventura, Calif.

Application October 2, 1933, Serial No. 691,796

5 Claims. (Cl. 188—91)

My invention relates to a hydraulic brake mechanism for vehicles and the like.

The objects of my invention are:

First.—To provide a hydraulic brake mechanism, in which braking action upon a revoluble member is effected by fluid pressure caused by the reciprocation of a piston which is reciprocated by the revoluble member, and in which the means for causing reciprocation is manually shiftable for negativing or allowing varying or decreased reciprocation of the piston, and thereby permitting free rotation of the revoluble member without resistance of a reciprocating piston or permitting rotation thereof with varying resistance;

Second.—To provide a mechanism of this class in which the means for causing reciprocation is located at the central portion of the revoluble member and the adjustment thereof is transverse with respect to the axis of rotation of the revoluble member, thereby reducing to a simple form the adjustment of the means causing reciprocation;

Third.—To provide such a mechanism in which the fluid-compression cylinder is carrier by one of the members of a revoluble member and its support, and in which the piston mounted therein, and the means for causing reciprocation thereof is mounted on or carried by the other of said members, thereby causing reciprocation of the piston and producing fluid pressure when the revoluble member is rotating;

Fourth.—To provide a mechanism of this class in which the cylinder is radially mounted on the revoluble member and the means for reciprocating the piston, which is mounted in the cylinder, is transversely adjustably mounted on the support for the revoluble member;

Fifth.—To provide novel means for controlling or adjusting the means causing reciprocation of the piston for varying the stroke of the reciprocation or negativing the reciprocation entirely;

Sixth.—To provide a mechanism of this class in which the pressure in the cylinder is controlled by a manually operated valve for controlling the reciprocation of the piston and thereby controlling the braking action upon the revoluble member;

Seventh.—To provide a mechanism of this class in which excessive pressure in the cylinder is automatically relieved by a safety valve, thus preventing sudden, positive braking;

Eighth.—To provide a novel valve for controlling the fluid pressure in the cylinder;

Ninth.—To provide novel means for controlling the valve and novel means for simultaneously shifting the piston reciprocating means and for operating said valve, and such means whereby the former is shifted to a large extent before the valve is materially operated;

Tenth.—To provide a novel safety valve and novel embodiment thereof in the control valve; and Eleventh.—To provide, as a whole, a novelly constructed mechanism of this class, and one which is simple and economical of construction, proportionate to its functions.

With these and other objects in view, as will appear hereinafter, I have devised a hydraulic brake mechanism having certain novel features of construction, combination, and arrangement of parts and portions and certain application to vehicles, as will be hereinafter described in detail, and particularly set forth in the appended claims, reference being had to the accompanying drawings and to the characters of reference thereon which form a part of this application, in which:

Fig. 1 is a fragmentary, side elevational view of a vehicle wheel embodying my invention, and showing parts thereof broken away and in section to facilitate the illustration, Fig. 2 is a fragmentary, sectional, elevational view thereof taken through 2—2 of Fig. 1, and 2—2 of Fig. 3, Fig. 3 is a fragmentary, sectional view thereof taken through 3—3 of Fig. 2, Fig. 4 is a fragmentary, transverse, sectional view taken through a cylinder and valve, taken through 4—4 of Fig. 2, showing the valve open, and Fig. 5 is a similar view thereof with the valve closed.

Like characters of reference refer to similar parts and portions throughout the several views of the drawings.

The specific embodiment of my invention, as shown in the drawings, is in the front wheel of a vehicle in which the wheel is adapted to be steered with respect to the frame. The spindle, designated 1, is non-rotatable, but shifted laterally about a king pin. The wheel, or wheel felly 2, is rotatably mounted by means of roller bearings 3 and 4 on the spindle as will be hereinafter more specifically described.

On the revoluble member, which in this instance is the vehicle wheel, and radially inwardly of the felly 2, are located a plurality of cylinders 11 which radiate outwardly from the axis of the wheel or the revoluble member, and are equally spaced with respect to each other. These cylinders are open at their inner ends. In these cylinders are reciprocally mounted pistons 12, which are connected, one by a main connecting rod 13, and the others by connecting rods 14, to an eccentric band 15.

The main connecting rod 13 is rigidly connected to the eccentric band, and is adapted to oscillate the latter with the reciprocation of the connecting rod 13, while the connecting rods 14 are pivotally connected to the band. This band is rotatably mounted on an eccentric 16, which is mounted on the spindle 1, but shiftable transversely with respect thereto, so that the axis of the eccentric and of the vehicle wheel may be shifted coincident with each other when not desiring to reciprocate the pistons, or the eccentric may be shifted various distances with respect to the axis of the vehicle wheel for varying the stroke of the pistons.

The eccentric 16 is provided with a transverse slot 16$^a$, through which extends a rectangular portion 1$^a$ of the spindle for non-rotatably mounting the eccentric on the spindle, but the slot 16$^a$ is of sufficient length to permit transverse shifting or adjustment of the eccentric for adjusting the axis coincident with the axis of the spindle or eccentric with respect thereto. The lateral or transverse shifting of the eccentric is effected by a collar 17 rotatably mounted on a cylinder portion 1$^b$ of the spindle and provided at its outer side with a pair of diametrically opposed lugs 18, which extend into cam shaped slots 16$^b$ and 16$^c$ at the inner side of the eccentric. These slots 16$^b$ and 16$^c$ are so shaped that, when the collar 17 is rotated in the direction of the arcuate arrow in Fig. 1, the eccentric is raised, as also indicated by the upwardly pointing arrow, thereby shifting the eccentric to an off center position and permitting reciprocation of the pistons. The collar 17 is shifted rotatably by an arm 19, extending inwardly with respect to the vehicle, and which is connected at its inner end to a suitable shifting arm 20. On the collar 17 is preferably mounted the roller bearing 3, upon which the inner side of the vehicle wheel is rotatably mounted.

At the inner sides of the cylinders 11 are mounted other cylinders 31 in which are secured, by means of collars 32, or other suitable means, inverted cone seat members 33. In these cone seat members are rotatably mounted cone valve members 34, which are forced against the seats by springs 35. These cone valves are provided at their inner ends with bearings 36, which are positioned eccentrically with respect to the axis of the cone valve members. These bearings are mounted in a ring 37, which is rotatably mounted between other rings 38 and 39, which are carried by a shifting member 40 in such a manner that, when the member 40 is shifted axially, the ring 37 is rotatable, permitting the bearing 36 to be shifted axially with respect to the vehicle wheel, but rotatably with respect to the axis of the cone valve member.

The inner portion of the member 40 straddles the arm 19, and is adapted to be rotated thereby. This member 40 also is provided with an outwardly directed flange 41, carrying pins 41$^a$, which extend into substantially helical slots 42$^a$ of the drum 42 secured to the spindle 1. Thus, when the member 40 is rotated, the same is also shifted laterally, thus causing rotation of the cone valve members. In this manner, the eccentric is shifted simultaneously with the adjusting of the cone valves. It will be here noted that the slots 42$^a$ are so shaped that the eccentric is shifted laterally to a large extent before the valves are materially shifted or operated.

The valves 34 are provided with cutout segments 34$^a$ and 34$^b$, which permit the fluid to pass to and from the cylinders to and from a reservoir 51, which is mounted on the vehicle wheel between the cylinders, forming a part thereof. When the valve is rotated to the position shown in Fig. 5, the liquid adapted to be compressed in the cylinder is prevented from passing from the cylinder unless the pressure therein becomes excessive.

To relieve such excessive pressure in the cylinder, there is provided in each valve a safety valve 61, which is held in a closed position by a spring 62, which is held in adjusted position by an adjusting screw 63. This valve 61 is adapted resiliently to engage a seat 34$^c$ connected with the cutout portion 34$^a$. The inner portion of this seat is connected by ports 34$^d$ with the cutout portions 34$^b$. Thus, when the valve 34 is in the position shown in Fig. 5, and the pressure in the cylinder becomes excessive, the safety valve 61 is disengaged from its seat, forcing the fluid from the cylinders, through the ports 34$^d$ into the cutout portions 34$^b$, and then into the reservoir 51.

The operation of my hydraulic brake is briefly as follows:

When the shifting arm 20 is in its receded position with the eccentric 16 in its lower position, as shown in the drawings, the eccentric band 15 is concentric with the axle spindle and wheel, permitting the wheel to rotate freely on the axle spindle without receiprocation of the pistons 12. The bifurcated arm which straddles the shifting pin or arm 19 is also receded, thereby causing the pin 41$^a$ to be located at the outer end of the slot 42$^a$, (or inner end with respect to the vehicle) and thus causing the valves 34 to be open. When the arm 20 is shifted toward the front of the vehicle the lugs 18 will be revolved in the direction of the arcuate arrow in Fig. 1 causing the eccentric to be raised eccentric to the axis of the axle spindle and causing the pistons to be reciprocated as the vehicle wheel is rotated. This outward shifting of the arm 20 and pin 19 also causes the flange member 41 to be rotated and the pins 41$^a$ to move in the helical slots 42$^a$, outwardly with respect to the vehicle, and thus rotating the valves 34 and closing the passage between the cylinders 31 and the reservoirs 51, causing resistance to the reciprocation of the pistons and the rotation of the wheel. As the arm 20 is shifted forwardly the resistance is increased until reciprocation of the pistons and rotation of the wheel is prevented and thus the braking effort fully applied.

Though I have shown and described a particular construction, combination, and arrangement of parts and portions, and a certain application thereof to a vehicle wheel and particularly a front vehicle wheel, I do not wish to be limited to this particular construction, combination, and arrangement, nor to the particular application or adaptation, but desire to include in the scope of my invention, the construction, combination, and arrangement substantially as set forth in the appended claims.

Having thus described my invention, what I claim as new and desire to secure by Letters Patent, is:

1. In a mechanism of the class described, a revoluble member, a support therefor, a cylinder mounted on one of the former, a bearing mounted on the other of the former at the central portion of the revoluble member, a piston reciprocally mounted in the cylinder, means mounted on the bearing and operatively connected with the piston, reservoir means connected with said cylinder, a valve for controlling the flow of fluid between the reservoir means and the cylinder, and means for shifting said bearing transversely with respect to the axis of the revoluble member and also operating said valve, the latter means being so constructed and arranged that said bearing is shifted transversely to a large extent before said valve is materially operated.

2. In a mechanism of the class described, a revoluble member having a cylinder therein, a piston reciprocally mounted in the cylinder, a non-rotatable bearing at the central portion of the revoluble member, means revolubly mounted on the bearing and operatively connected with the piston, reservoir means connected with said cylinder, a valve for controlling the flow of fluid between the reservoir means and the cylinder, and means for shifting said bearing transversely with respect to the axis of the revoluble member and also operating said valve, the latter means being so constructed and arranged that said bearing is shifted transversely to a large extent before said valve is materially operated.

3. In a mechanism of the class described, a revoluble member, a support therefor, a cylinder mounted on one of the former, a bearing mounted on the other of the former at the central portion of the revoluble member, a piston reciprocally mounted in the cylinder, means mounted on the bearing and operatively connected with the piston, means for shifting said bearing transversely with respect to the axis of said revoluble member, a rotary valve for controlling the flow of fluid between the reservoir means and the cylinder, and a safety valve transversely and resiliently mounted in said control valve for relieving the excessive pressure in the cylinder when the latter is disconnected from the reservoir means by the control valve.

4. In a fluid brake, a stationary shaft, a bearing rotatably mounted thereon, a revoluble member mounted on the bearing and having a cylinder therein, a piston mounted in the cylinder, an eccentric transversely shiftably mounted on the shaft outwardly of the bearing, means operatively connecting the piston to the eccentric, means for rotating the bearing, and means connecting the bearing and eccentric for shifting the eccentric transversely with the rotation of the bearing.

5. In a fluid brake, a stationary shaft, a bearing rotatably mounted thereon, a revoluble member mounted on the bearing and having a cylinder therein, a piston mounted in the cylinder, an eccentric transversely shiftably mounted on the shaft outwardly of the bearing, means operatively connecting the piston to the eccentric, means for rotating the bearing, means connecting the bearing and eccentric for shifting the eccentric transversely with the rotation of the bearing, a valve at the side of the cylinder, and means connecting the bearing rotating means with the valve for shifting the valve with the shifting of the eccentric.

HOWARD E. MARSH.